United States Patent
Ghosh

[11] Patent Number: 5,991,285
[45] Date of Patent: Nov. 23, 1999

[54] METHOD AND APPARATUS FOR COMMUNICATING SIGNALS OF VARIOUS CHANNEL TYPES IN CDMA COMMUNICATION SYSTEM

[75] Inventor: Amitava Ghosh, Vernon Hills, Ill.

[73] Assignee: Motorola, Inc., Schaumburg, Ill.

[21] Appl. No.: 09/131,628

[22] Filed: Aug. 10, 1998

[51] Int. Cl.$^6$ .................................................. H04B 7/216
[52] U.S. Cl. .......................... 370/335; 370/342; 370/542; 375/200; 455/69
[58] Field of Search ..................................... 370/328, 329, 370/335, 336, 342, 345, 441, 442, 479, 478, 500, 536, 542, 544, 573; 375/200, 206; 455/550, 561, 569, 570, 68, 69, 70

[56] References Cited

U.S. PATENT DOCUMENTS

| | | | |
|---|---|---|---|
| 5,265,119 | 11/1993 | Gilhousen et al. | 370/335 |
| 5,485,486 | 1/1996 | Gilhousen et al. | 370/335 |
| 5,497,395 | 3/1996 | Jou | 375/205 |
| 5,629,934 | 5/1997 | Ghosh et al. | |
| 5,644,591 | 7/1997 | Sutton | 375/200 |
| 5,799,005 | 8/1998 | Soliman | 370/335 |
| 5,805,648 | 9/1998 | Sutton | 375/367 |
| 5,809,061 | 9/1998 | Shea et al. | 375/206 |
| 5,881,368 | 3/1999 | Grob et al. | 455/69 |
| 5,901,178 | 5/1999 | Lee et al. | 375/240 |
| 5,930,230 | 7/1999 | Odenwalder et al. | 370/208 |

OTHER PUBLICATIONS

ETSI STC SMG2 UMTS-L1, SMG2 UMTS Physical Layer Expert Group UTRA Physical Layer Description FDD Parts (vO. 4, Jun. 25, 1998), Sec. 1–4.3.3.3.

*Primary Examiner*—Ajit Patel
*Assistant Examiner*—Bob A Phunkulh
*Attorney, Agent, or Firm*—Sayed Hossain Beladi

[57] ABSTRACT

In a code division multiple access communication system providing a plurality of communication type services between a first unit (100) and a second communicating unit (200) by time-multiplexing a plurality of data channel signals (101, 102, 103) associated with the plurality of communication type services to produce a time-multiplexed data channel signal (106) which are combined to produce a combined signal (136). Combined signal (136) is transmitted from first unit (100) to be received by second unit (200). After producing a code-demultiplexed time-multiplexed data channel signal (218), and a plurality of signal-to-interference ratios estimated based on a plurality of time-multiplexed portions of signal (218), a plurality of power control thresholds corresponding to the plurality of communication type services are compared to the plurality of signal-to-interference ratios. As a result, producing a plurality of power control data bits corresponding to the plurality of communication type services based.

17 Claims, 4 Drawing Sheets

METHOD AND APPARATUS FOR COMMUNICATING SIGNALS OF VARIOUS CHANNEL TYPES IN CDMA COMMUNICATION SYSTEM

FIELD OF THE INVENTION

The present invention relates to communication systems, and more particularly, to code division multiple access communication systems.

BACKGROUND OF THE INVENTION

A code division multiple access (CDMA) communication system may include a base station and a number of mobile stations. The base stations adjust power levels of a number of communication channel signals targeted for a corresponding number of mobile stations and at least a control channel signal, and code-multiplexes the signals to produce a combined signal. The base station transmits the combined signal via a wireless communication downlink from the base stations to the mobile stations.

When a mobile station receives the combined signal, it code-demultiplexes the received combined signal according to its assigned multiplexing code to recover its targeted communication channel information. The mobile station measures a signal-to-interference ratio of the code-demultiplexed control channel signal or communication channel signal or both, and compares the result to a power control threshold to produce a power control data bit. The mobile station transmits the power control data bit to the base station via a wireless communication uplink. The base station adjusts the power level of the communication channel signal targeted for the mobile station according to the status of the power control data bit.

The level of the power control threshold is independently determined such that when the signal-to-interference ratio of the received signal is at a level comparable to the threshold, the signal may be demodulated at an adequate frame error rate in the receiver section of the mobile station. The level of the power control threshold is dependent on the level of the adequate frame error rate as determined by the communication system standard. The power level of the communication channel signal is adjusted to account for channel variations such that an adequate frame error rate is maintained. Furthermore, the power level of the communication channel signal is adjusted to maintain a comparable power levels among all mobile stations in the communication system.

Similarly, the base station also compares the signal-to-interference ratio of a signal transmitted from the mobile station in the uplink to a power control threshold. A power level control data bit as a result of the comparison is transmitted to the mobile station in a downlink traffic channel to change the mobile station transmit power level. If the signal-to-interference ratio is less than the threshold, power control data bit indicates an increase of power level, and if conversely, it indicates a power level decrease.

In the prior art, communication channels have been of the same type such as a voice channel type. Therefore, a power control data bit and a power control threshold have been sufficient to control power level of each channel signal to maintain an adequate communication link. Recently, various telecommunication standard committees have proposed a CDMA communication system that provides a number of communication type services simultaneously. Such a system is commonly know as the 3G-CDMA system. In the proposed CDMA communication system, voice, video and data channel types signals are code-multiplexed, or code and time multiplexed to produce a combined signal. Documents regarding such proposed communication systems and other information may be obtained by contacting European Telecommunication Standard Institute (ETSI), located European Telecommunications Standards Institute, 650 Rt. des Lucioles-Sophia Antipolis, Valbonne-FRANCE. The combined signal may be transmitted from a mobile station on an uplink or from a base station on a downlink. The mobile station and the base station simultaneously in a single connection communicate voice, video and data information. Normally, a communication channel of voice type signal has a frame error rate requirement that is different than frame error rates of other types of communication channels, such as video and data types. As a result, a common power control data bit and a common power control threshold are not sufficient to control power level of all channel types signals to maintain an adequate communication link for services of all channel types.

Therefore, there is a need for a power control scheme that solves the problem of satisfying different requirements of communicating signals of various channel types.

DETAILED DESCRIPTION OF THE PREFERRED EMBODIMENT(S)

Figure 1:
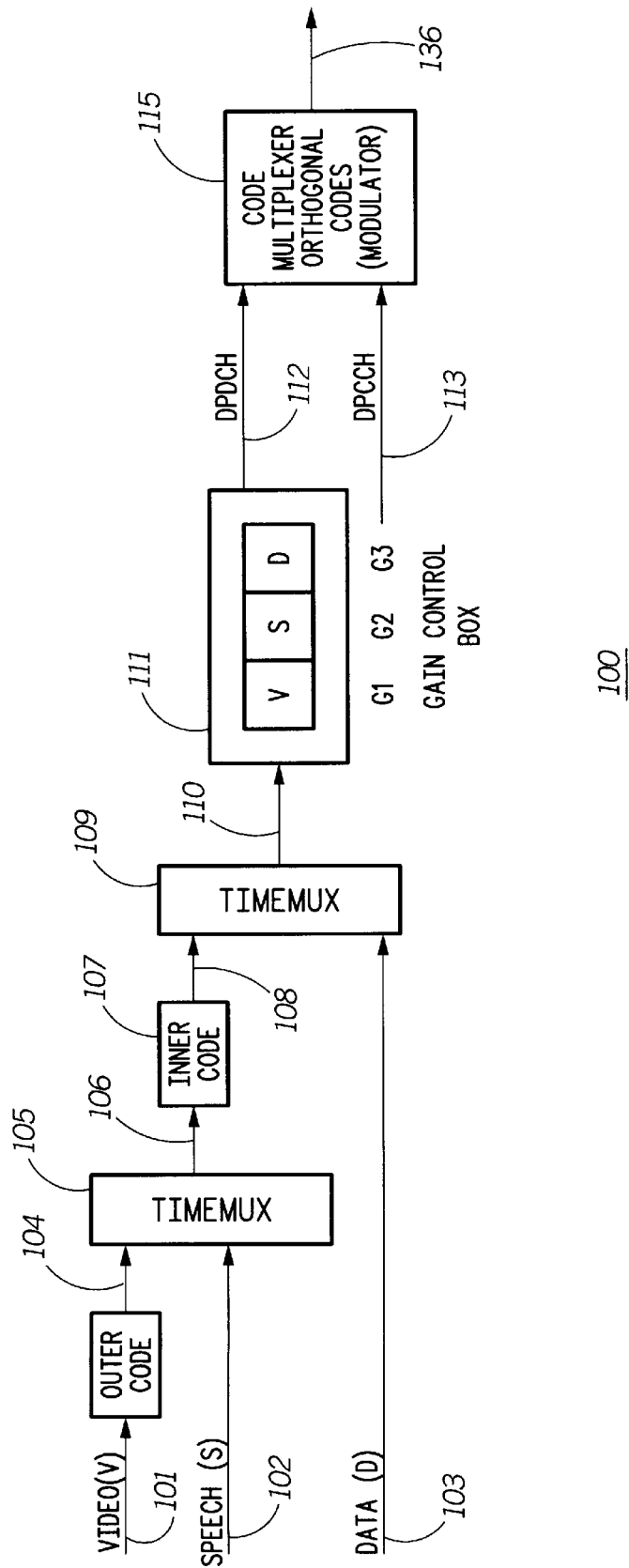
FIG. 1 depicts a transmitter 100 according to various embodiments of the invention.

A code division multiple access (CDMA) communication system provides communication of a plurality of channel types between a first and second communicating units. The first and second communicating units may be respectively a mobile station and a base station. The mobile station time-multiplexes a plurality of data channel signals associated with the plurality of channel types to produce a time-multiplexed data channel signal. Moreover, the mobile station code-multiplexes the time-multiplexed data channel signal and a control channel signal to produce a combined signal. The mobile station transmits the combined signal via an uplink communication link to the base station. The base station code-demultiplexes the combined signal to produce a code-demultiplexed time-multiplexed data channel signal and a code-demultiplexed control channel signal. The base station estimates a plurality of signal-to-interference ratios based on a plurality of time multiplexed portions of the code-demultiplexed time-multiplexed data channel signal. The plurality of signal-to-interference ratios correspond to the plurality of channel types, and each time multiplexed portion corresponds to a channel type. The base station compares a plurality of power control thresholds corresponding to the plurality of channel types to the plurality of signal-to-interference ratios. The base station produces a plurality of power control data bits corresponding to the plurality of channel types based on the comparing step. The base station transmits the plurality of power control data bits via a downlink signal to the mobile station.

One advantage of the invention is producing a plurality of power control data bits that are corresponding to the plurality of channel types. As such, the power level of each data channel signal corresponding to a channel type can be controlled independently. Since the plurality of power control thresholds corresponds to the plurality of channel types, power level of each data channel signal may be controlled according to its unique frame error rate requirements for each channel type services.

The mobile station receives the plurality of power control data bits via the downlink communication. The mobile station adjusts power levels of the plurality of data channel signals in the uplink corresponding to the plurality of power control data bits according to one or more predetermined step sizes. According to a preferred embodiment of the invention, the power level adjustments takes place after time multiplexing the plurality of data channel signals in the uplink. Power level of each data channel signal is adjusted independently. The time multiplexed signal consists of various time multiplexed portions where each portion corresponds to a channel type. Each power control data bit, thus, corresponds to a time multiplexed portion. The power levels of the time multiplexed signals at various time multiplexed portions are adjusted according to various power control data bits corresponding to the time multiplexed portions.

The plurality of code-demultiplexed time-multiplexed data signals and the code-demultiplexed control channel signal in the base station may be received in a time frame format and each frame may have a plurality of time multiplexed slots. The time multiplexing may be performed by incorporating channel type signals in a single slot time. Such that a slot contains a portion of each channel type signals. In such a case, the base station measures each signal-to-interference ratio based on data contained in one of the plurality of time slots. Therefore, for each time slot, a new plurality of signal-to-interference ratio is measured, and the status of the power control data bit is updated for each time slot. One or more time slots may be dedicated for communication of data associated with a channel type, and a time slot may be dedicated to one or more channel types.

The base station time-demultiplexes the code-demultiplexed time-multiplexed data signal to produce a plurality of code-and-time-demultiplexed data signals corresponding to the plurality of data channel signals. The base station determines a plurality of frame erasures corresponding to the plurality of code-and-time-demultiplexed data signals. The frame erasures are based on the data contained in each portion of the time multiplexed signal associated with a channel type. Since each channel type has an associated power control threshold, the base station adjusts each power control threshold corresponding to a channel type based on the frame erasures associated with the channel type. Accordingly, the plurality of power control thresholds that are corresponding to the plurality of the communication type services are adjusted based on their corresponding frame erasures.

Referring to FIG. 1, a transmitter 100 according to various embodiments of the invention is shown. Data signals 101, 102 and 103 are signals associated with various channel types. Signal 101 is a video signal for video channel type, signal 102 is a speech signal, or voice signal, for voice channel type, and signal 103 is a data signal for data channel type. Video signal 101 is channel coded in channel coder 170 to produce channel coded video signal 104. Voice signal 102 and signal 104 are inputs to time multiplexer 105 to produce a time multiplexed video and voice signal 106. Signal 106 is channel coded in channel coder 107 to produce a signal 108. Signal 108 and data signal 103 are inputs to time multiplexer 109 to produce a time multiplexed video, voice and data signal 110. Time multiplexed signal 110 according to an aspect of the invention passes through signal power gain adjuster 111 to adjust power level of signal 110 according to various gain settings associated with video, voice and data signals 101, 102 and 103. Since signal 110 is time multiplexed, each time multiplexed portion has an independent gain setting. After adjusting gain levels of signal 110, power gain adjuster 111 produces time multiplexed data channel signal 112. Signal 112 and a control channel signal 113 are code multiplexed via a code multiplexer 115 to produce a combined signal 136. Each of signals 112 and 113 has a unique assigned orthogonal code.

Figure 2:
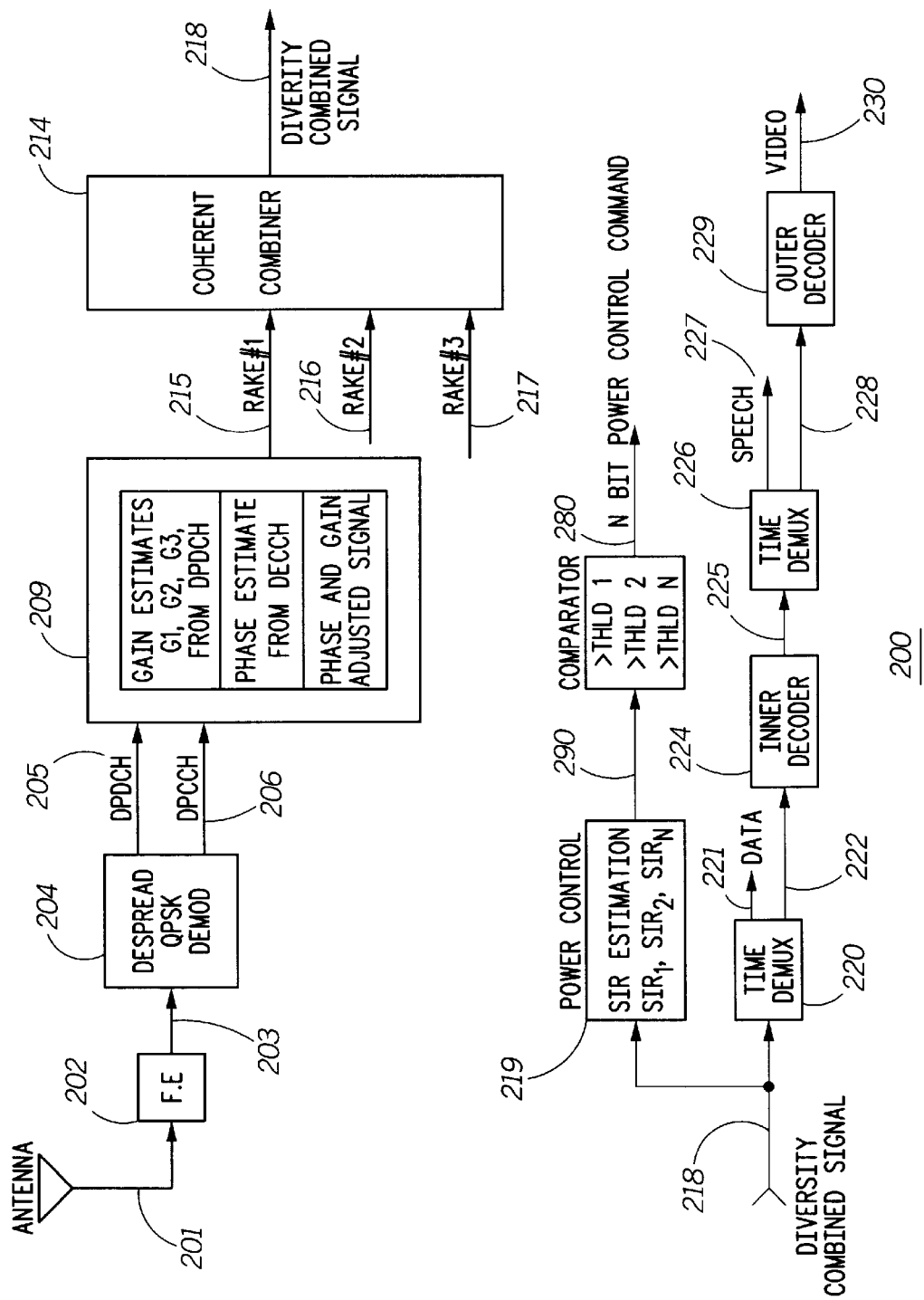
FIG. 2 depicts a receiver 200 according to various embodiments of the invention.

Referring to FIG. 2, a receiver 200 according to various embodiments of the invention is shown. A combined signal via a wireless link is received at an antenna 201. Receiver front end 202 converts the received signal to a received signal 203 suitable for processing by a code-demultiplexer 204. Code-demultiplexer 204 produces code-demultiplexed control and data channel signals 206 and 205 respectively. Data channel signal 205 which is in a time multiplexed format is processed by a gain and phase estimator 209 to produce a time multiplexed signal 215. Control signal 206 is used by gain and phase estimator 209 for estimating phase of signal 215. Since signal 215 is in a time multiplexed format, according to an aspect of the invention, gain and phase estimator 209 uses a plurality of gain settings associated with video, voice and data signals to estimate gain corresponding to each time multiplexed portion of signal 215. Signal 215 is a time multiplexed signal consisting of video, speech and data channel type. Signal 215 along with other Rake receiver signals, such as signal 216 and 217, are combined in a diversity RAKE combiner 214 to produce a data channel time-multiplexed signal 218. Signal-to-interference ratio of signal 218 is estimated in estimator 219 for each time slot. Since signal 218 is time multiplexed signal of various channel types, estimator 219 estimates each signal-to-interference ratios based on a time multiplexed portion of the signal 218 associated with a channel type. The estimated signal-to-interference ratios are compared with a corresponding plurality of power control thresholds in block 290 to produce a plurality of power control data bits 280. The plurality of power control data bits 280 corresponding to the plurality of channel types are transmitted to the transmitting unit for adjustments of video, voice and data signal power levels. Signal 218 is time demultiplexed in time demultiplexer 220 to produce a data signal 221 and signal 222. Signal 222 is channel decoded in decoder 224 to produce a signal 225. Signal 225 passes through time demultiplexer 226 to produce a speech, or voice, signal 227 and a signal 228. Signal 228 is decoded in channel decoder 229 to produce a video signal 230.

Figure 3:
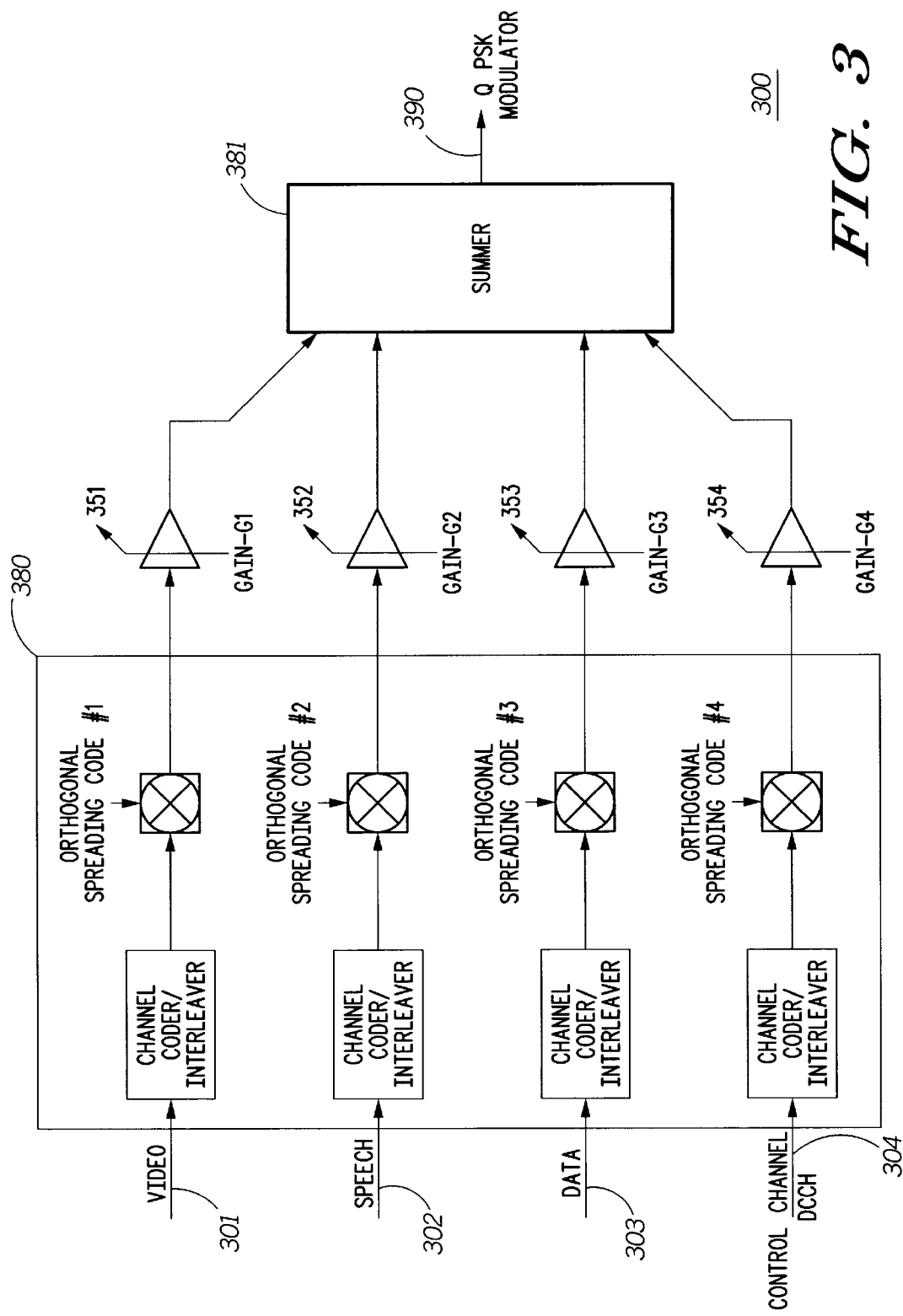
FIG. 3 depicts a transmitter 300 according to various embodiments of the invention.
Figure 4:
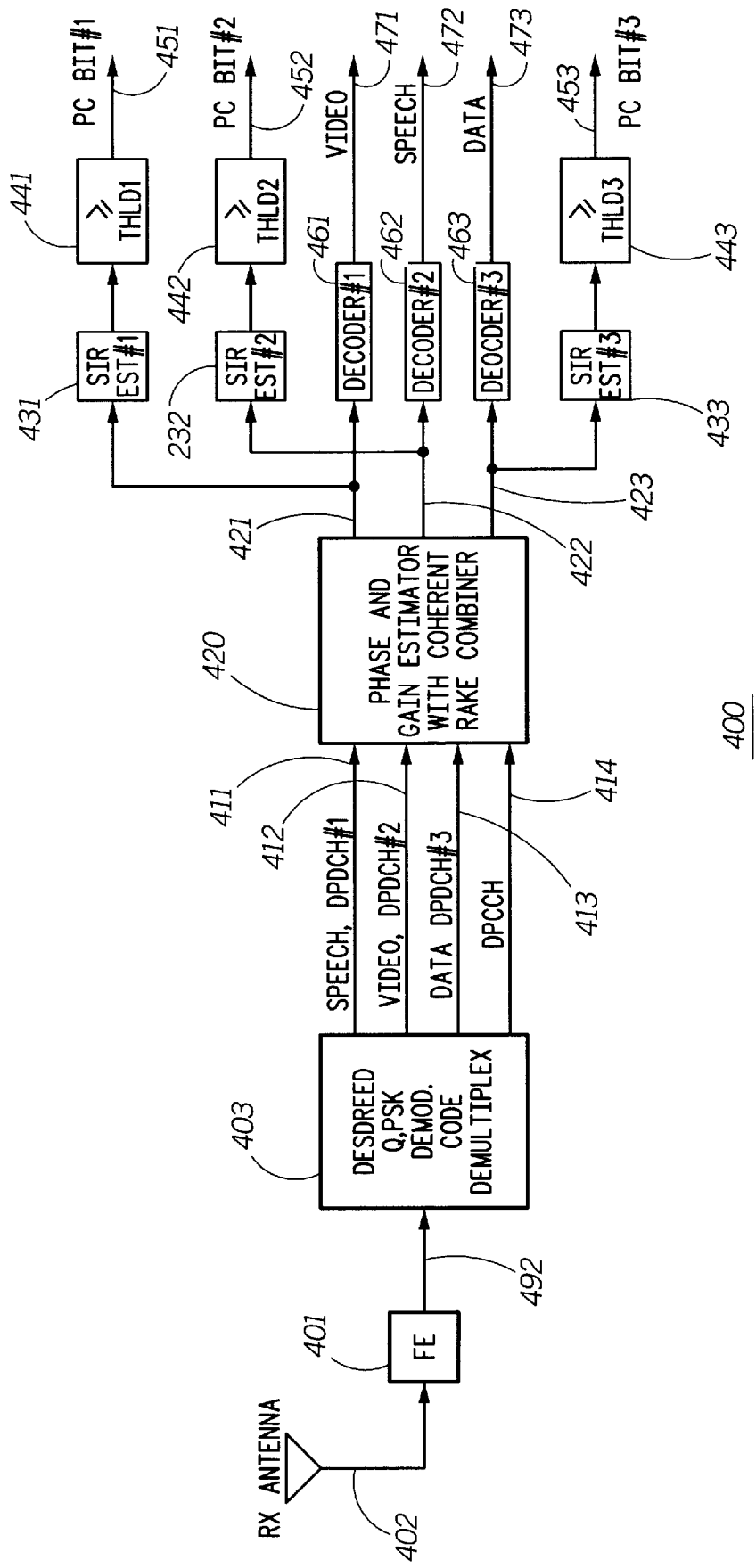
FIG. 4 depicts a receiver 400 according to various embodiments of the invention.

A transmitter and a receiver according to various embodiments of the invention are shown in FIGS. 3 and 4. Referring to FIGS. 3 and 4, a code division multiple access communication system provides a plurality of communication type services between a first and second communicating units, units 300 and 400, by code-multiplexing a first control channel signal 304 and a plurality of data channel signals, such as video signal 301, speech signal 302, data signal 303, associated with the plurality of communication type services, in a channel coder 380 and a summer 381 to produce a combined signal 390. The combined signal 390 is transmitted from the first unit 300 to be received by the second unit 400. The first or second unit may be either a base station or a mobile station in the communication system. After receiving the combined signal 390 at antenna 402 and appropriately translating the combined signal in a radio frequency frond end 401, a signal 492 is produced suitable for processing in the remaining portion of the unit 400. Second unit 400 code-demultiplexes signal 492 in a code demultiplexer (despreader and demodulator) 403 to produce a plurality of code-demultiplexed data signals 411–413 and a code-demultiplexed first control channel signal 414. Signals 411–414 are input to a phase and gain estimator 420. Phase and gain estimator 420 may include coherent combiner for diversity combining operation. The phase and gain corrected diversity combined resulting signals 421–423 corresponding to the plurality of communication type services are produced. According to the invention, a plurality of signal to interference ratios are estimated based on signals 421–423 in estimators 431–433, and the plurality of signal to interference ratios are compared with a plurality of power control thresholds corresponding to the plurality of communication type services in comparator 441–443. As a result, comparator 441–443 produce a plurality of power control data bits 451–453 corresponding to the plurality of communication type services. Signals 421–423 are decoded in decoders 461–463 to produce signals 471–473. Signals 471–473 are associated with the plurality of communication type services such as video, speech and data. As such, according to an advantage of the invention, each plurality of communication type services has a corresponding power control data bits to maintain adequate frame error rate for each signal independently.

The plurality of power control data bits 451–453 are transmitted via at least a second control channel signal from unit 400. The first unit, unit 300, receives the plurality of power control data bits 451–453 via the second control channel signal. The plurality of power control data bits 451–453 are converted to plurality of power control data bits 351–353. The unit 300 adjusts power levels of the plurality of data channel signals 301–303 according to the plurality of power control data bits 351–353. The control, channel signal 304 may have its own independent or fixed gain adjustment data bit 354.

When the plurality of code-demultiplexed data signals 411–413 and the code-demultiplexed first control channel signal 414 are in a frame format and each frame has a plurality of time slots, the plurality of signal-to-interference ratios are associated with one of the plurality of time slots. Furthermore, the second unit, unit 400 determines a plurality of frame erasures based on the plurality of code-demultiplexed data signals which are corresponding to the plurality of communication type services, and adjusts the plurality of power control thresholds based to the plurality of frame erasures. The plurality of frame erasures may be indicating quality of the plurality of communication services.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a code division multiple access communication system providing a plurality of communication type services between a first and second communicating units by time-multiplexing a plurality of data channel signals associated with said plurality of communication type services to produce a time-multiplexed data channel signal and code-multiplexing said time-multiplexed data channel signal and a control channel signal to produce a combined signal and transmitting said combined signal from said first unit to be received by said second unit, a method comprising the steps of:

code-demultiplexing said combined signal to produce a code-demultiplexed time-multiplexed data channel signal and a code-demultiplexed control channel signal;

comparing a plurality of power control thresholds corresponding to said plurality of communication type services to a plurality of signal-to-interference ratios estimated based on time-multiplexed portions of said code-demultiplexed time-multiplexed data channel signal corresponding to said plurality of communication type services;

producing a plurality of power control data bits corresponding to said plurality of communication type services based on said comparing step;

transmitting from said second unit said plurality of power control data bits to said first unit.

2. The method as recited in claim 1 wherein said first unit is a mobile station and said second unit is a base station in said communication system.

3. The method as recited in claim 1 further comprising the steps of:

receiving said plurality of power control data bits in said first unit;

adjusting, after time multiplexing said plurality of data channel signals, power levels of said plurality of data channel signals corresponding to said plurality of power control data bits.

4. The method as recited in claim 3 wherein said adjusting is according to a predetermined step size.

5. The method as recited in claim 1 wherein said plurality of code-demultiplexed time-multiplexed data signals and said code-demultiplexed control channel signal are in a frame format and each frame has a plurality of time slots, said plurality of signal-to-interference ratios are associated with said plurality of time slots.

6. The method as recited in claim 5 further comprising the steps of:

time-demultiplexing said code-demultiplexed time-multiplexed data signal to produce a plurality of code-demultiplexed time-demultiplexed data signals corresponding to said plurality of data channel signals;

determining a plurality of frame erasures based on said plurality of code-demultiplexed time-demultiplexed data signals;

adjusting said plurality of power control thresholds corresponding to said plurality of frame erasures.

7. In a code division multiple access communication system providing a plurality of communication type services between a first and second communicating units by code-multiplexing a first control channel signal and a plurality of data channel signals associated with said plurality of communication type services to produce a combined signal and transmitting said combined signal from said first unit to be received by said second unit, a method comprising the steps of:

code-demultiplexing said combined signal to produce a plurality of code-demultiplexed data signals and a code-demultiplexed first control channel signal;

comparing a plurality of power control thresholds corresponding to said plurality of communication type services to a plurality of signal-to-interference ratios estimated based on corresponding said plurality of code-demultiplexed data channel signals;

producing a plurality of power control data bits corresponding to said plurality of communication type services based on said comparing step;

transmitting from said second unit said plurality of power control data bits via at least a second control channel signal.

8. The method as recited in claim 7 further comprising the steps of:

receiving said plurality of power control data bits in said first unit via said second control channel signal;

adjusting power levels of said plurality of data channel signals corresponding to said plurality of power control data bits.

9. The method as recited in claim 8 wherein said adjusting is according to a predetermined step size.

10. The method as recited in claim 7 wherein said plurality of code-demultiplexed data signals and said code-demultiplexed first control channel signal are in a frame format and each frame has a plurality of time slots, said plurality of signal-to-interference ratio are associated with one of said plurality of time slots.

11. The method as recited in claim 10 further comprising the steps of:

determining a plurality of frame erasures based on said plurality of code-demultiplexed data signals which are corresponding to said plurality of communication type services;

adjusting said plurality of power control thresholds based to said plurality of frame erasures.

12. The method as recited in claim 11 wherein said plurality frame erasures are indicating quality of said plurality of communication services.

13. The method as recited in claim 7 wherein said signal-to-interference ratio is estimated based on said code-demultiplexed data channel signals and said code-demultiplexed first control channel signal.

14. In a code division multiple access communication system providing a plurality of communication type services between a first and second communicating units by time-multiplexing a plurality of data channel signals associated with said plurality of communication type services to produce a time-multiplexed data channel signal and code-multiplexing said time-multiplexed data channel signal and a control channel signal to produce a combined signal and transmitting said combined signal from said first unit to be received by said second unit, an apparatus comprising:

means for code-demultiplexing said combined signal to produce a code-demultiplexed time-multiplexed data channel signal and a code-demultiplexed control channel signal;

means for comparing a plurality of power control thresholds corresponding to said plurality of communication type services to a plurality of signal-to-interference ratios estimated based on time-multiplexed portions of said code-demultiplexed time-multiplexed data channel signal corresponding to said plurality of communication type services;

means for producing a plurality of power control data bits corresponding to said plurality of communication type services based on said comparing step;

means for transmitting from said second unit said plurality of power control data bits to said first unit.

15. The apparatus as recited in claim 14 further comprising:

means for receiving said plurality of power control data bits in said first unit;

means for adjusting, after time multiplexing said plurality of data channel signals, power levels of said plurality of data channel signals corresponding to said plurality of power control data bits.

16. In a code division multiple access communication system providing a plurality of communication type services between a first and second communicating units by code-multiplexing a first control channel signal and a plurality of data channel signals associated with said plurality of communication type services to produce a combined signal and transmitting said combined signal from said first unit to be received by said second unit, an apparatus comprising:

means for code-demultiplexing said combined signal to produce a plurality of code-demultiplexed data signals and a code-demultiplexed first control channel signal;

means for comparing a plurality of power control thresholds corresponding to said plurality of communication type services to a plurality of signal-to-interference ratios estimated based on corresponding said plurality of code-demultiplexed data channel signals;

means for producing a plurality of power control data bits corresponding to said plurality of communication type services based on said comparing step;

means for transmitting from said second unit said plurality of power control data bits via at least a second control channel signal.

17. The method as recited in claim 16 further comprising the steps of:

means for receiving said plurality of power control data bits in said first unit via said second control channel signal;

means for adjusting power levels of said plurality of data channel signals corresponding to said plurality of power control data bits.

* * * * *